US007480123B2

(12) United States Patent
Jones

(10) Patent No.: US 7,480,123 B2
(45) Date of Patent: Jan. 20, 2009

(54) ELECTRICAL RECEPTACLE

(75) Inventor: Thaddeus M. Jones, Bremen, IN (US)

(73) Assignee: MSX, Incorporated, South Bend, IN (US)

( * ) Notice: Subject to any disclaimer, the term of this patent is extended or adjusted under 35 U.S.C. 154(b) by 2 days.

(21) Appl. No.: 11/248,359

(22) Filed: Oct. 12, 2005

(65) Prior Publication Data

US 2007/0081286 A1 Apr. 12, 2007

(51) Int. Cl.
*H02H 3/00* (2006.01)
*H02H 1/00* (2006.01)

(52) U.S. Cl. .......... 361/42

(58) Field of Classification Search .......... 361/42
See application file for complete search history.

(56) References Cited

U.S. PATENT DOCUMENTS 2,027,576 A * 1/1936 Chandler .......... 318/279
2,942,090 A * 6/1960 Diehl .......... 392/392
3,233,091 A * 2/1966 Hunt .......... 362/183
3,260,835 A * 7/1966 Soukey et al. .......... 219/213
3,275,888 A * 9/1966 Dresser .......... 361/32
3,312,802 A * 4/1967 Ryckman, Jr. .......... 337/102
3,522,595 A * 8/1970 White .......... 340/593
4,352,008 A * 9/1982 Hofer et al. .......... 219/540
4,558,209 A * 12/1985 Hess .......... 219/530
4,739,153 A * 4/1988 Rendel et al. .......... 392/363
4,837,421 A * 6/1989 Luthy .......... 392/390
4,873,424 A * 10/1989 Ryder et al. .......... 219/521
5,174,153 A * 12/1992 Nakano .......... 73/295
5,204,498 A * 4/1993 Russell .......... 174/528
6,289,176 B1 * 9/2001 Martter et al. .......... 392/392
6,423,900 B1 * 7/2002 Soules .......... 174/66
6,478,440 B1 * 11/2002 Jaworski et al. .......... 362/96
6,707,372 B2 * 3/2004 Davis et al. .......... 337/376
2005/0236557 A1 * 10/2005 Hurst .......... 250/214 R

* cited by examiner

*Primary Examiner*—Ronald W Leja
(74) *Attorney, Agent, or Firm*—Taylor & Aust, P.C.

(57) ABSTRACT

An electrical receptacle including a housing having an inwardly directed side and an electrical resistor thermally coupled to the inwardly directed side of the housing.

18 Claims, 2 Drawing Sheets

ELECTRICAL RECEPTACLE

BACKGROUND OF THE INVENTION

1. Field of the Invention

The present invention relates to an electrical receptacle, and, more particularly, to a ground fault interrupter receptacle.

2. Description of the Related Art

Ground fault interrupter circuits are utilized in places where there is an elevated probability that a person may come in contact with electricity, particularly, where an individual may be strongly coupled to an electrical ground. Such an environment commonly exists around places having a high moisture content. High moisture content areas may include water fountains, swimming pool, kitchen and bathroom environments.

Wiring codes require ground fault interrupter circuits for electrical receptacles placed outside around pools, in bathrooms and kitchens. In each of these places there is an elevated likelihood that a person in contact with an electrical item may also be well grounded by way of contact with water. Likewise, ground fault interrupter circuits provide protection if an electrical appliance is coupled to a water source and the circuit is compromised by passing some electrical power to the water. While the resulting conduction can place a body of water at an elevated electrical potential, which is potentially hazardous to people in the vicinity thereof, the ground fault interrupted circuit opens the circuit. Ground fault interrupter circuits may be implemented by way of a ground fault interrupter breaker being placed in the wiring panel or by way of a ground fault interrupter receptacle having an interrupter circuit built therein.

Ground fault interrupter circuits function by detecting the flow of current out of a conductor and the returning current through another conductor. If there is an imbalance in the current flow the circuit path is interrupted, thereby protecting individuals in the vicinity from electrical shock. The assumption associated with these sorts of circuits include the assumption that a current imbalance is caused by a portion of the current finding an alternate path of conduction, which could be hazardous to an individual. Due to the sensitive nature of such a design, slight imbalances caused by alternate conduction paths can trip and interrupt the circuits. For example, a ground fault interrupter (GFI) receptacle will trip if a conduction path between a power conductor and the safety ground exists, such as a conductive moisture path formed of condensed water. When the GFI receptacle trips, it removes power from anything plugged thereinto.

What is needed in the art is a GFI receptacle, which reduces spurious current paths.

SUMMARY OF THE INVENTION

The present invention provides a heated GFI receptacle.

The invention comprises, in one form thereof, an electrical receptacle including a housing having an inwardly directed side and an electrical resistor thermally coupled to the inwardly directed side of the housing.

An advantage of the present invention is that heat from the resistor eliminates condensate from the face of the housing of the receptacle.

Another advantage of the present invention is that it reduces unnecessary circuit interruptions.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
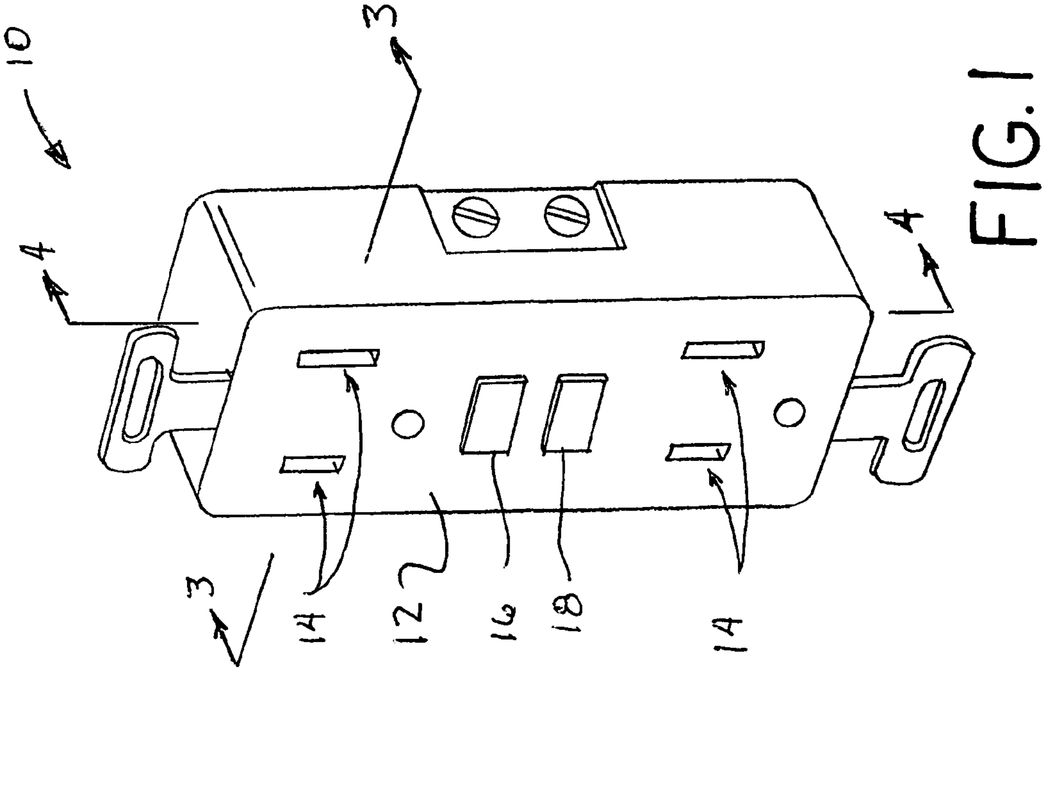
FIG. 1 is a perspective view of an embodiment of a ground fault interrupter receptacle of the present invention.

Referring now to the drawings, and more particularly to FIG. 1, there is shown a receptacle assembly 10 in the form of a ground fault interrupter (GFI) receptacle 10 including a housing 12 having openings 14 therein. Additionally, assembly 10 includes a GFI reset button 16 and a GFI test button 18. If the circuit is interrupted, the circuit is reset by manually depressing GFI reset button 16. In order to test the functioning of the GFI interruption circuit, GFI test button 18 is depressed thereby causing a current imbalance that results in the circuit being opened by action of the ground fault interruption circuit.

Figure 2:
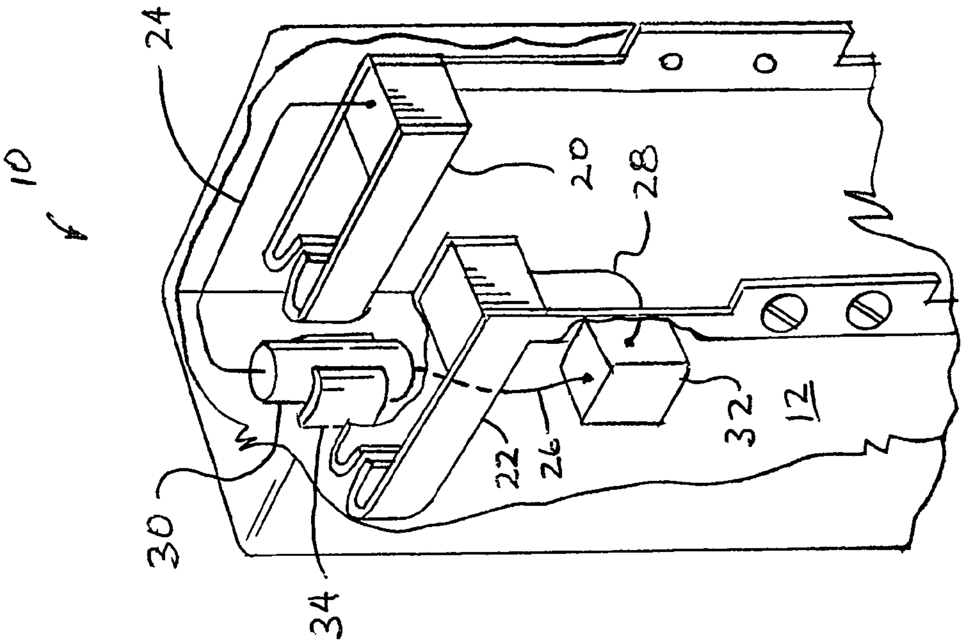
FIG. 2 is a partial fragmentary perspective view of the ground fault interrupter receptacle of FIG. 1.
Figure 3:
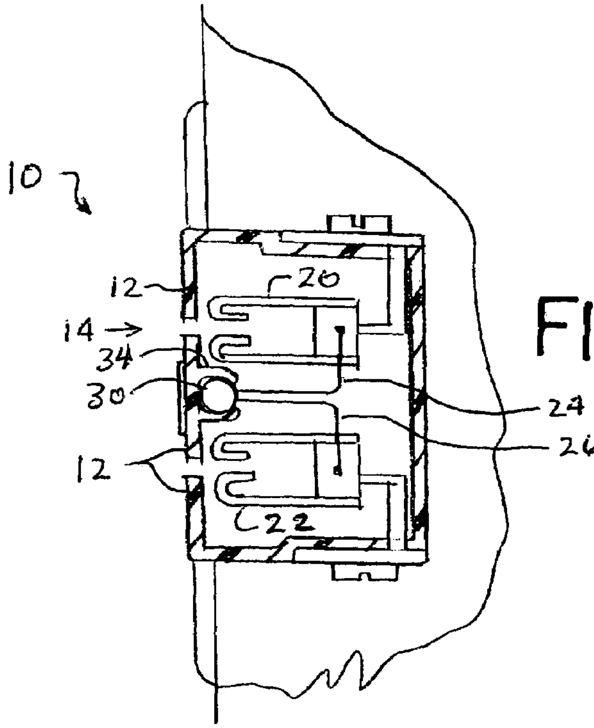
FIG. 3 is a cross-sectional view, along line 3-3, of the receptacle of FIGS. 1 and 2.

Now, additionally referring to FIG. 2 there is shown a line terminal 20, a neutral terminal 22, conductors 24, 26 and 28, a resistor 30, a temperature controller 32 and resistor clips 34. Line terminal 20 and neutral terminal 22 are closely associated with openings 14 of cover plate 12. Housing 12 may be a cover plate 12 that is applied to assembly 10 or it may be an integral non-conductive housing 12 as shown in FIG. 1. Openings 14 allow the entrance of prongs from an electrical plug. The prongs from a plug, respectively, electrically connect with line terminal 20 and neutral terminal 22 as they are inserted through openings 14. Resistor 30 is electrically connected by way of conductor 24 to line terminal 20. Conductor 26 electrically connects resistor 30 to temperature controller 32, or alternatively to neutral terminal 22, as depicted in FIG. 3. Temperature controller 32 is then electrically connected to neutral terminal 22.

Resistor 30 is selected to provide sufficient heat to keep condensate from the atmosphere from forming on housing 12. When condensate forms on housing 12, the condensate provides a potential path for electrical conduction from line terminal 20 to the safety ground, which can cause the GFI circuit contained therein to open the electrical circuit. By preventing the formation of condensate, by way of heat from resistor 30, the potential alternate circuit path is eliminated. Resistor 30 is thermally coupled with cover plate 12 allowing conduction of heat from resistor 30 to be conducted through and across the surface of cover plate 12. Although one resistor is illustrated, more than one resistor may be utilized to distribute the heat from various locations on the back side of cover plate 12.

The value of resistor 30 may be selected to provide a constant heat output regardless of the temperature of housing 12 thereby eliminating the need for temperature sensor 32. Temperature sensor 32 is thermally coupled to cover plate 12 to thereby regulate the temperature of cover plate 12 and it disconnects electrical power to resistor 30, once cover plate 12 reaches a desired predetermined temperature. Although resistor 30 is shown as an axial leaded resistor, any resistor form known in the art may be utilized to provide heat to plate 12.

Figure 5:
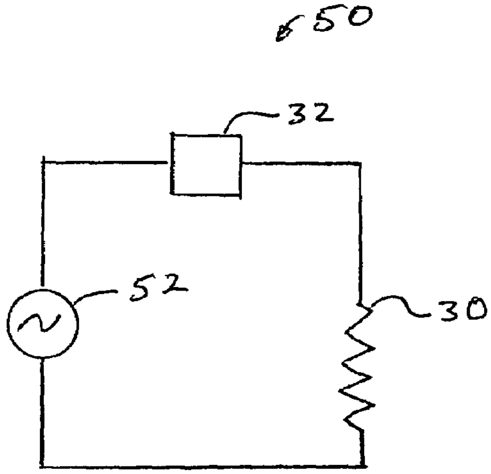
FIG. 5 is a schematic view of a portion of the circuit contained in ground fault interrupter receptacle of FIGS. 1-4.
Figure 4:
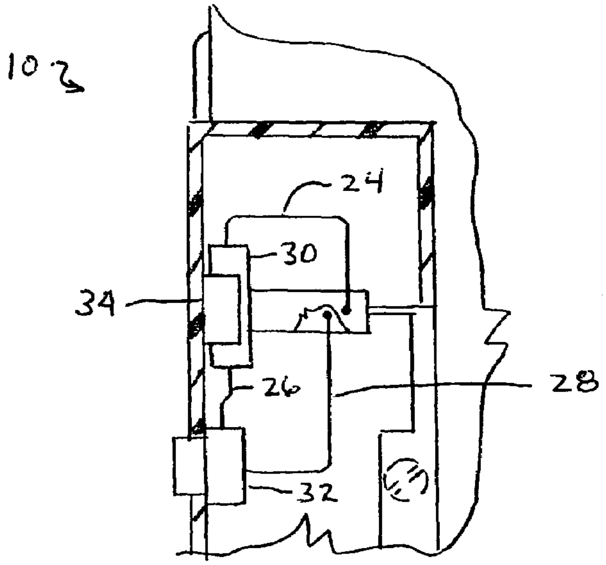
FIG. 4 is another cross-sectional view, along line 4-4, of the receptacle of FIGS. 1-3.

The schematic of FIG. 5 illustrates a power source 52 supplying electrical energy in series with temperature controller 32 and resistor 30. When the temperature of face plate 12 is below a predetermined value, temperature controller 32 allows power to flow through the circuit and through resistor 30 thereby elevating the temperature of face plate 12 by the dissipation of heat from resistor 30.

In operation a small amount of heat dissipation along face plate 12 prevents the formation of condensate upon assembly 10, thereby reducing the probability of false circuit interruptions and potential for electrical hazard due to the presence of moisture. GFI outlets are often along outside walls of homes, which in a cold environment cause the outlets to generally be at a reduced temperature, which leads to the formation of condensate, hence the need for the heated face plate offered by the present invention. It should be noted that the actual ground fault interruption circuitry is not shown in the figures for ease of understanding of the present invention. The electrical connection of resistor 30 may be on the non-faulted portion of the circuit or on the faulted portion of the circuit, as illustrated in FIG. 2.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electrical receptacle, comprising:

a housing having an exterior portion with an inwardly directed side, said housing including a plurality of openings through said side, said side being electrically nonconductive;

a plurality of electrical terminals positioned within the receptacle including a neutral terminal and a line terminal, said neutral terminal positioned proximate to one of said plurality of openings and configured to receive a prong of a plug, said line terminal positioned proximate to another one of said plurality of openings and configured to receive another prong of the plug; and an electrical resistor thermally coupled to said inwardly directed side of said housing, said electrical resistor being proximate to said openings.

2. The receptacle of claim 1, wherein said electrical resistor is electrically coupled to said line terminal and said neutral terminal, said electrical resistor being positioned between said neutral terminal and said line terminal.

3. The receptacle of claim 2, wherein said electrical resistor is of a selected predetermined value to provide sufficient heat to said housing to prevent condensation from forming on said housing.

4. The receptacle of claim 1, further comprising a temperature controller controllably connected to said electrical resistor.

5. The receptacle of claim 4, wherein said temperature controller is thermally coupled to said housing, said temperature controller maintaining said housing at a predetermined temperature by selectively supplying electrical power to said electrical resistor.

6. The receptacle of claim 1, wherein the electrical receptacle is a ground fault interrupter receptacle.

7. An electrical assembly, comprising:

a plate having an exterior portion with a plurality of openings therein for establishing electrical connections therethrough;

a plurality of electrical terminals positioned within the receptacle including a neutral terminal and a line terminal, said neutral terminal positioned proximate to one of said plurality of openings and configured to receive a prong of a plug, said line terminal positioned proximate to another one of said plurality of openings and configured to receive another prong of the plug, the plug being an electrical plug having the prong and the another prong extending therefrom, the plug being removable from the electrical assembly; and an electrical resistor thermally coupled to said plate, said electrical resistor being proximate to at least one of said openings.

8. The assembly of claim 7, wherein said electrical resistor is electrically coupled to said line terminal and said neutral terminal.

9. The assembly of claim 8, wherein said electrical resistor is a predetermined value that is selected to provide sufficient heat to said plate to prevent condensation from forming on said plate.

10. The assembly of claim 7, further comprising a temperature controller controllably connected to said electrical resistor.

11. The assembly of claim 10, wherein said temperature controller is thermally coupled to said plate, said temperature controller maintaining said plate at a predetermined temperature by selectively supplying electrical power to said electrical resistor.

12. The assembly of claim 7, wherein the electrical assembly is a ground fault interrupter receptacle.

13. A method of preventing the formation of condensate on an electrical receptacle, comprising the steps of:

thermally coupling an electrical resistor to an inner surface of an exterior wall of a housing of the electrical receptacle between two openings in said exterior wall; and supplying electrical power to said electrical resistor.

14. The method of claim 13, further comprising the step of positioning a plurality of electrical terminals positioned within the receptacle including a neutral terminal and a line terminal.

15. The method of claim 14, further comprising the step of electrically coupling said electrical resistor to said line terminal and said neutral terminal.

16. The method of claim 15, further comprising the step of selecting a value of said electrical resistor so as to provide sufficient heat to said housing to prevent the formation of condensate on said housing.

17. The method of claim 14, further comprising the step of connecting a temperature controller to said electrical resistor.

18. The method of claim 17, further comprising the steps of:

thermally coupling said temperature controller to said housing; and maintaining said housing at a predetermined temperature by selectively supplying electrical power to said electrical resistor.

* * * * *